United States Patent [19]

Shoberg

[11] 4,065,962

[45] Jan. 3, 1978

[54] LOAD CELL

[75] Inventor: Ralph S. Shoberg, Farmington Hills, Mich.

[73] Assignee: GSE, Inc., Farmington Hills, Mich.

[21] Appl. No.: 668,538

[22] Filed: Mar. 19, 1976

Related U.S. Application Data

[63] Continuation of Ser. No. 518,382, Oct. 29, 1974, abandoned.

[51] Int. Cl.² ............................................. G01L 5/00
[52] U.S. Cl. ................................................. 73/141 A
[58] Field of Search ........................ 73/141 A; 338/5

[56] References Cited

U.S. PATENT DOCUMENTS

| | | | |
|---|---|---|---|
| 2,561,318 | 7/1951 | Ruge | 73/141 A |
| 2,796,503 | 6/1957 | Ward | 73/141 A |
| 2,933,921 | 4/1960 | Gloor | 73/93 |
| 3,216,245 | 11/1965 | Seed | 73/141 A |
| 3,222,628 | 12/1965 | Pien | 73/141 A |
| 3,309,921 | 3/1967 | Eckard et al. | 338/5 |
| 3,315,202 | 4/1967 | Johns et al. | 338/5 |
| 3,315,203 | 4/1967 | Jacobson | 73/141 A |
| 3,559,467 | 2/1971 | Gurol et al. | 73/141 A |

OTHER PUBLICATIONS

Peter R. Perino; "Wheatstone Bridge Transducer Equations"; Statham Inst. Notes; Los Angeles, Cal.; Feb. 1966; pp. 1-8.

*Primary Examiner*—James J. Gill
*Assistant Examiner*—Anthony V. Ciarlante
*Attorney, Agent, or Firm*—Krass & Young

[57] ABSTRACT

A load cell which may be embodied in an arch beam structure or a shear tension link and comprising a flexure area design which requires the machining of only five parallel holes. The five holes comprise a large central hole and four satellite holes to define two opposite load paths, each including two flexure areas which react to a load in opposite tension-compression sense. Strain gage resistors of the foil type are bonded onto the flexure areas and connected into a Wheatstone bridge circuit.

12 Claims, 8 Drawing Figures

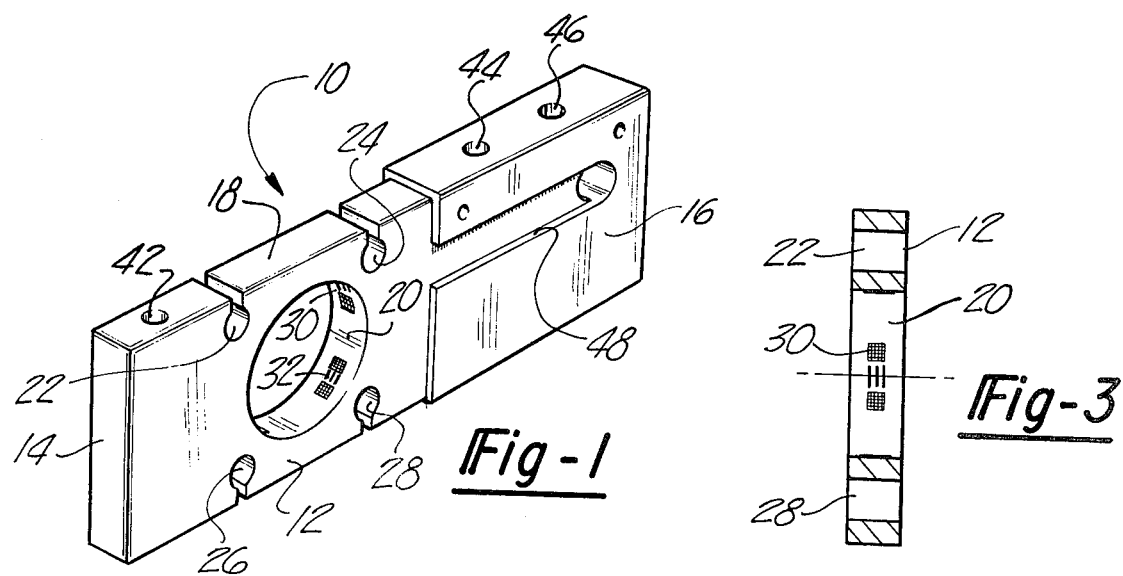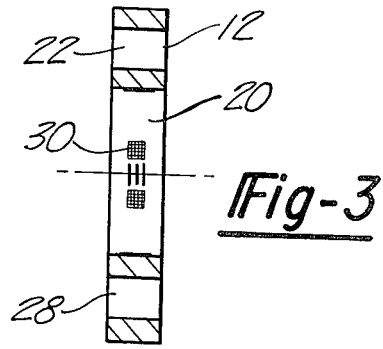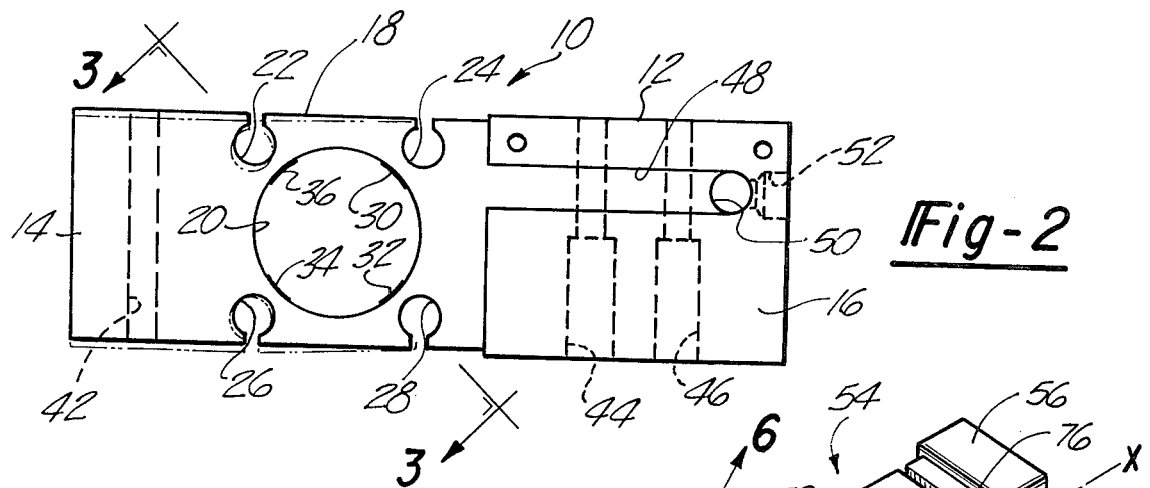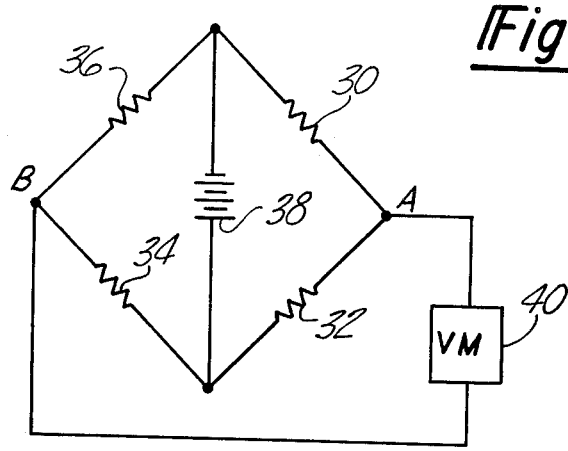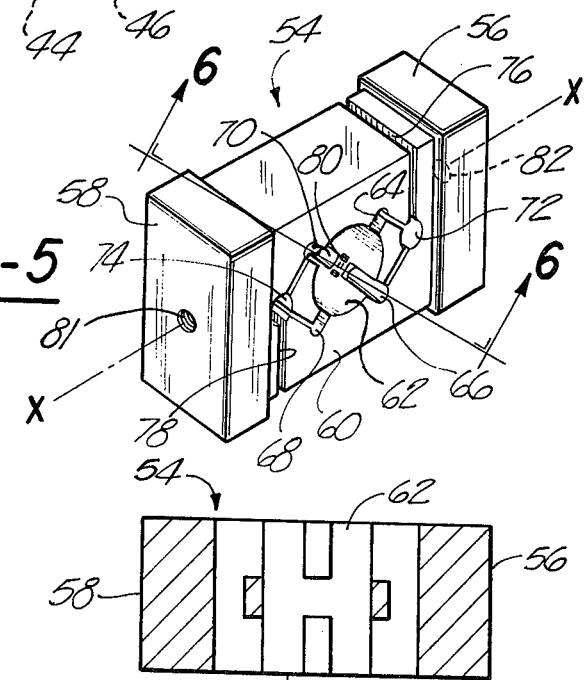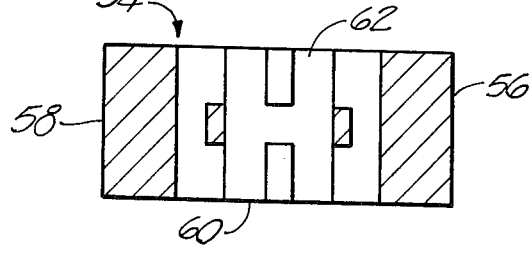

4,065,962

LOAD CELL

This is a continuation, of application Ser. No. 518,382 filed Oct. 29, 1974, now abandoned.

INTRODUCTION

This invention relates to load cells and particularly to a load cell which can be used for a variety of purposes such as single axis tension and compression measurement as well as beam loading. The cell is characterized by high precision and extreme ease of manufacture due to the simple flexure design.

BACKGROUND OF THE INVENTION

It is well known to measure forces using a beam type load cell wherein first and second spaced rigid end structures are interconnected by a plurality of relatively long parallel struts of high modulus of elasticity material. These struts tend to flex in the fashion of parallelogram links when one of the end structures is fixed to a reference surface and the other end structure is loaded. Strain sensitive means such as thin foil resistors may be bonded to the struts to monitor strain therein under load. The strain sensitive resistors are interconnected into a bridge circuit which is calibrated to produce an output voltage proportional to load.

While the device described above is reasonably effective for measuring loads in a beam type flexure fashion, the formation of the long parallel struts poses an extremely difficult machining problem since it is preferable, if not essential, that the entire cell including the spaced end structures and the parallel struts be an integral unit; i.e., formed from a single piece of solid stock. Moreover, the nature of the struts is such that it is relatively difficult to obtain a high precision cell while staying within reasonable cost limits.

BRIEF DESCRIPTION OF THE INVENTION

It is the principal object of the present invention to provide a load cell which is capable of various uses including beam type loading and which is both accurate and easy to manufacture. This is accomplished by a simple flexure design which minimizes the need for precision machining operations and which, in the typical embodiment, can be formed simply by boring a plurality of holes or apertures along easily located parallel axes.

In accordance with the preferred embodiment of the invention, a load cell is provided which is characterized by a solid integral body of high modulus of elasticity material having longitudinally opposite end portions which are typically used to apply the load or affix the device to a reference surface such as the case may require. In addition, the body of the load cell is so formed as to define a first aperture which is typically mediate the end portions and which extends fully between opposite faces of the body. In addition, a plurality of second, typically smaller, satellite apertures are formed in the body around the first aperture and uniformly reversely similarly spaced on opposite sides of the longitudinal axis. This arrangement of holes or apertures provides two parallel force paths between the end portions, one path on either side of the first aperture, and each path having first and second stress concentrating flexure areas of greatly reduced cross-sectional area bounded by the first aperture and one of the second apertures.

In the illustrative embodiments of the invention hereinafter described in detail, the first aperture is a fairly large through bore drilled between opposite plane faces of a solid bar of aluminum stock. The second apertures are four in number and are uniformly spaced around and adjacent the first aperture such that each of the parallel force paths includes two reduced section flexure areas. When loaded as a beam, the flexure areas cause parallelogram type deflection of the two end portions thus to load two of the flexure areas in tension and two in compression. Strain sensitive gage means may be disposed on the flexure areas by convenient location on the interior wall of the central aperture so as to measure these tension and compression forces. As usual, the strain sensitive means are readily connected into a bridge circuit so as to produce an output signal which is proportional to load.

Alternatively, the simple flexure design of the subject invention may be incorporated into a single axis tension-compression cell again by forming the pattern of holes in the load cell mediate the end portions which, of course, are provisioned to accept a load. In addition, the parallelogram action is created by a pair of longitudinally spaced and oppositely entering slots which are cut transversely through the body so as to laterally displace the force application points on the longitudinally opposite sides of the flexure area. Again, strain sensitive gage devices are placed in the central hole to monitor the tension and compression reactions in the flexure areas. The strain sensitive means are in turn connected into a bridge circuit to produce a useable output signal.

Of course, may other uses or embodiments of the invention are possible. The details, as well as the various features and advantage of the present invention may be best understood by a reading of the following specification in which two embodiments of the invention are fully described in such concise detail as to enable those skilled in the art to make and use these as well as other embodiments of the invention.

BRIEF DESCRIPTION OF THE DRAWINGS

FIG. 1 is a perspective view of a first illustrative embodiment of the invention adapted to measure loads in the fashion of a shear beam;

FIG. 2 is a plan view of the device of FIG. 1;

FIG. 3 is a sectional view along section line 3—3 of the device of FIG. 2;

FIG. 4 is a schematic circuit diagram of a typical bridge circuit;

FIG. 5 is a perspective view of a second embodiment of the invention adapted to measure tension and compression forces along a longitudinal axis;

FIG. 6 is a sectional view of the device of FIG. 5 along a section line 6—6;

DETAILED DESCRIPTION OF SPECIFIC EMBODIMENTS

Figure 7:
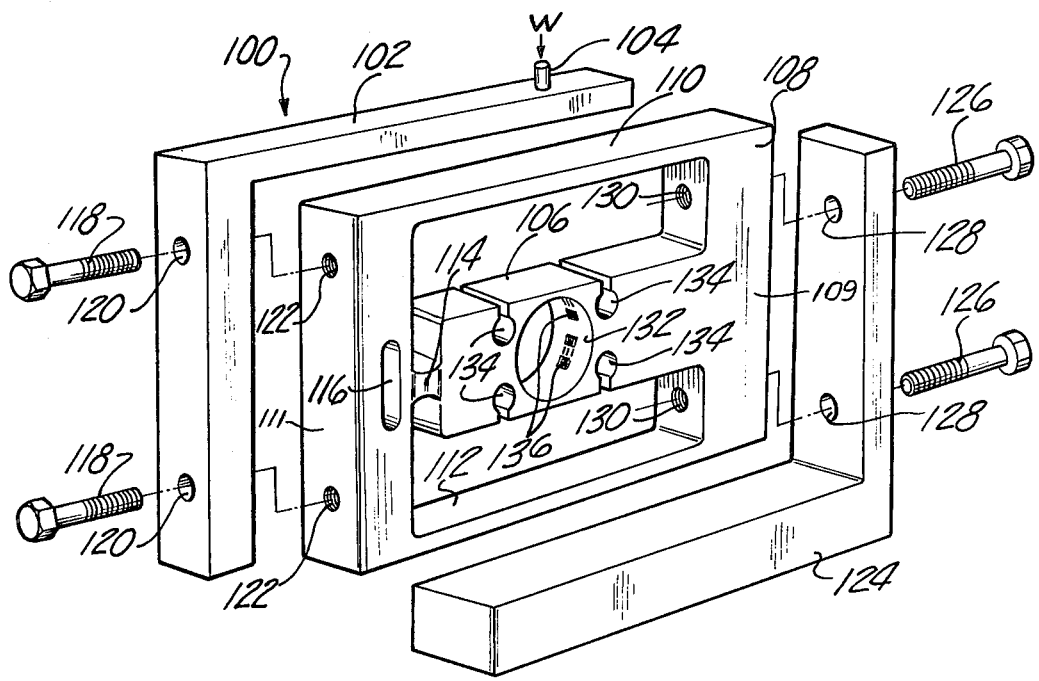
FIG. 7 is a perspective view of a weigh scale structure embodying the invention.

Looking now to FIGS. 1 through 4, the invention is first shown to be embodied in an arch beam load cell 10 for measuring loads such as weights and mechanical forces and comprising a solid body 12 of high modulus of elasticity material such as aluminum, steel or other machinable and dimensionally stable material. Body 12 is of longitudinally elongated shape having a generally rectangular cross-section and is machined to define first and second longitudinally opposite end portions 14 and 16 and a central stress concentrating flexure portion 18. These portions of the body 12 are defined by a large central aperture 20 which is bored and finished through the body 12 between the major plane faces thereof and of such diameter as to substantially reduce the load-bearing cross-sectional area of the body in the vicinity of the aperture 20. Four additional apertures 22, 24, 26 and 28 are bored and machined into the body 12, the axes of these additional apertures being parallel to that of the aperture 20 and being arranged uniformly and reversely similarly with respect to the longitudinal axis of the body 12. In the illustrated case, four apertures are disposed at 90° intervals around the aperture 20 and on equal radii such that the apertures 22 and 24 lie above the longitudinal center line. These additional apertures all open to the laterally opposite edges of the body 12 so as to create, in combination with the aperture 20, two parallel load paths from one longitudinal end portion to the other and on opposite ends of the aperture 20. The upper load path, for example, includes two flexure areas of greatly reduced cross-section where stress concentration occurs. These flexure areas include the reduced sectional portion of the body between apertures 20 and 24 and between apertures 20 and 22. Similar but transversely opposite flexure areas exist in the body between apertures 20 and 28 and again between apertures 20 and 26.

To measure the strain in the flexure areas, variable resistance foil-type strain gages 30, 32, 34 and 36 are insulatively bonded to the interior surface of the aperture 24 on the flexure areas as previously defined. These strain gages are connected into the well-known Wheatstone bridge circuit shown in FIG. 4 with strain gages 30 and 32 forming one leg of the bridge and strain gages 34 and 36 forming the other leg of the bridge. A voltage source 38 is connected across both legs of the bridge and a voltage responsive meter 40 is connected to the midpoints of the two legs so as to produce an output reading which is proportional to resistance changes in the two legs due to the imposition of a load as hereinafter described in greater detail. The strain gage resistors are all of the same nominal value in the typical case and the bridge circuit is set to produce a zero reading when there is no load imposed upon the arch beam load cell 10.

Load cell 10 is further provided with facilities for receiving a load in the fashion of a beam by securing end portion 16 to a reference surface and securing end portion 14 to the loading mechanism. To this end, a tapped hole is formed transversely through end portion 14 between the laterally opposite edges of the body 12 such that a load support rod may be threaded into the body and a load applied along the axis of the threaded hole 42. Threaded or tapped holes 44 and 46 are formed in the opposite end portion 16 to receive machine screws or the like for securing the load cell to a reference surface such as a scale frame, a laboratory table or the like. End portion 16 may be integrally machined or separately jacketed to produce the reinforcement sleeve which is apparent in the drawings so as to facilitate securement to the reference or support structure. A longitudinally extending surface slot 48 is formed in the jacket along with drilled holes 50 and 52 to provide a convenient and protected path for the connecting wires of the bridge circuit, it being necessary to interface the bridge circuit strain gages with the voltage source 38 and the voltage meter 40 at some point at least relatively remote from the transducer itself.

In a typical operation, the loading of the end portion 14 with a vertical load such as depending weight causes a parallelogram type transverse shifting of end portion 14 relative to end portion 16 with the upper and lower force paths deflecting in the manner of parallel beams or struts as indicated by the phantom lines in FIG. 2. The strain which is concentrated in the flexure areas is such as to produce tension at the flexure areas associated with gages 32 and 36 and compression at the flexure areas associated with gages 30 and 34. The tension forces at or in strain gages 32 and 36 causes a resistance change in one direction, for example a resistance increase, in gages 32 and 36 while the compression forces at the other flexure areas produces a resistance change in the opposite direction, for example a decrease in resistance, in gages 30 and 34. Thus, the total resistance of each leg of the bridge circuit may remain substantially constant but the values of the individual resistors in the two legs change in an inverse fashion so that the potentials at the bridge points A and B swing in opposite directions. In the example given, the potential at point A tends to decrease while the potential at point B tends to increase and the resulting potential difference between points A and B produces a voltage reading across the meter 40. The bridge circuit is preferably calibrated so that the reading on meter 40 is directly related to the magnitude of the imposed load.

Looking now to FIGS. 5 and 6, the invention is shown embodied in a second load cell 54 which is configured to measure loads having components which lie along the axis X—X. Like load cell 10, the cell 54 is machined to define longitudinally opposite end portions 56 and 58 and a central portion 60. Within the central portion 60 is machined a large central aperture 62 abounded by four uniformly spaced parallel apertures 64, 66, 68 and 70 of lesser diameter. In addition, two longitudinally spaced holes or apertures 72 and 74 are drilled or machined into the body of cell 54 along the measurement axis and, like the other apertures, extending fully between the opposite plane faces of the load cell 54. Load cell 54 is further machined so as to define a first slot 76 extending between one lateral edge of the cell and the aperture 72 and a second slot 78 extending between the opposite lateral edge and aperture 74. The load cell body is further slotted so that apertures 64 and 66 open to aperture 72 and apertures 68 and 70 open to aperture 74. It will also be noted from the cross-sectional view of FIG. 6 in combination with the perspective view of FIG. 5 that the satellite aperture 64, 66, 68 and 70 open to the central aperture 62 except at the center line of the load cell 54 thus to define four stress concentrating flexure areas on which are insulatively bonded strain gage transducers represented by transducer 80 in FIG. 5. As was the case with respect to load cell 10, there are four such strain gage transducers so disposed at 90° intervals and an equal radii around the interior surface of the aperture 62 and connected into the Wheatstone bridge circuit of FIG. 4 to monitor strain in the load cell 54 as a result of a tensile or compression load imposed along the axis X—X. It will be seen that the transverse slots 76 and 78 together with the basic five-aperture flexure design in the central portion 60 of the load cell 54 result in the production or definition of two parallel load paths, each having two flexure areas to produce a strain pattern which is similar or identical to the strain pattern realized by the load cell 10 of FIG. 1 through 3 when subjected to beam type loading. In other words, two diagonally opposite strain gages vary in one sense while the remaining diagonally opposite strain gages vary in the other sense when the load is applied. In the illustrated case, the load cell 80, along with the diagonally opposite load cell adjacent aperture 70, would experience a compression force if the load cell 54 were loaded in tension along the axis X—X. Conversely, the strain gages associated with the flexure areas adjacent aperture 66 and 70 would be loaded in tension thus to produce the variations in resistance necessary to produce the bridge output reading previously described with reference to FIG. 4.

The transducer 54 includes two longitudinally opposite tapped holes 81 and 82 into which load-applying rods or the like may be inserted.

Referring now to FIG. 7 there is shown a weigh scale structure 100 embodying the invention and adapted to provide an electronic signal representing the mass or weight W applied to an input frame 102 by way of a support post 104. As will be noted from inspection of FIG. 7 the structure 100 incorporates the basic five-hole flexure design into a structure which is designed for resistance to structural warpage due to off-axis loads and similar factors.

Structure 100 comprises, in addition to the input frame member 102, an arch beam 106 having flexure apertures 132 and 134 formed therein and being integrally attached to a rigid support frame 108. Frame 108 is substantially rectangular, comprising relatively heavy vertical end structures 109 and 111 interconnected by relatively thin spring sections 110 and 112. In addition to being integral with the righthand portion 109 of the frame 108 as shown in FIG. 7, the arch beam 106 is also integrally connected with the lefthand frame section by a hinge 114 which is reduced down to a minimum cross-section to avoid distortion in the end of beam 106 when a load is applied via frame 102 and structure 111. The anti-distortion effect is further enhanced by the aperture 116 which is milled or otherwise formed in the portion 111 of the support frame adjacent the flexure area 114. The input frame member 102 is mechanically secured to the frame 108 by means of machine screws 118 which extend through holes 120 in the frame 102 and into tapped holes 122 in the lefthand portion of the frame 108.

The structure 100 further comprises a support frame member 124 which is L-shaped in design and which is mechanically connected to the right side of the support frame 108 by means of machine screws 126 which extend through the holes 128 in the frame member 124 and enter tapped holes 130 in the frame member 108. The member 124 rests on and is connected to a base, not shown.

Looking to the main flexure area of beam 106, the large central aperture 132 is adjoined by the satellite apertures 134 in the fashion previously described with reference to FIGS. 1 and 2 to provide the five-hole flexure. The apertures 132 and 134 are preferably located closer to the end of the beam 106 adjacent frame 102 than the opposite end. The reduced cross-section areas between the apertures 134 and the aperture 132 are the locations at which the strain measurement is taken and to this end the strain gage resistors 136 are bonded to the flexure areas and connected into a bridge circuit as previously described.

In use, the frame 102 is mechanically connected to the left side of the frame 108 as seen in FIGS. 7 and the frame member 124 is mechanically connected to the right side or reference side of the frame 108 by means of the machine screws 126. The post 104 carries a pan (not shown) or other flat structure of considerable area so as to receive objects for precision weight measurement. The imposition of a load W onto the pan imposes the same load on the frame member 102. The load is thus transmitted directly to the lefthand side 111 of the frame 108. Because the portion 111 of the frame is connected with the righthand side 109 only by way of the thin spring hinge section 110 and 112, (in addition to the arch beam 106) the load, for all practical purposes, acts directly upon the lefthand side of the arch beam 106 to cause strain in the flexure area as previously described. Should the weight be placed off-center on the pan or other receiving structure, the resulting moment on the input frame structure 102 is resisted by the hinges 110 and 112 since, although they are extremely resilient in response to pure vertical loads, they offer substantial resistance to torsional warpage as well as longitudinal loads. Thus, the hinge structures 110 and 112, in addition to the flexure are or hinge 114, resist error producing warpage in the arch beam and result in the pure shear load caused by the weight W on the left side of the beam and the necessary reaction or support of equal magnitude and opposite direction in the right side of the frame 108 as will be apparent to those skilled in engineering mechanics.

It should be apparent from the foregoing description of the structure 100 of FIG. 7 that even greater resistance to warpage may be achieved by widening the frame 108 out into a box-like structure having end plates in place of the vertical end portions of the frame 108 and having the corners of these plates longitudinally horizontally interconnected by thin hinge sections, two at the top and two at the bottom in place of the hinge sections 110 and 112. However, the substantially uniplanar structure of FIG. 7 has the advantage of easy machinability and thus may be preferred over such a three-dimensional structure.

To fabricate the device of FIG. 7 it is clear that a duplicating type mill may be employed with a template representing half of the frame structure 108 since it is reversely similar or symmetrical about a horizontal center line. In the fabricatio process, a single block or plate of machinable material such as aluminum or steel is preferably shaped by boring the apertures 132, 134, 122, and 130. Thereafter, the balance of the machining takes place thus to form the thin hinge sections 110, 112, and 114. Aperture 116 may be milled out either before or after the main milling operation.

Figure 8:
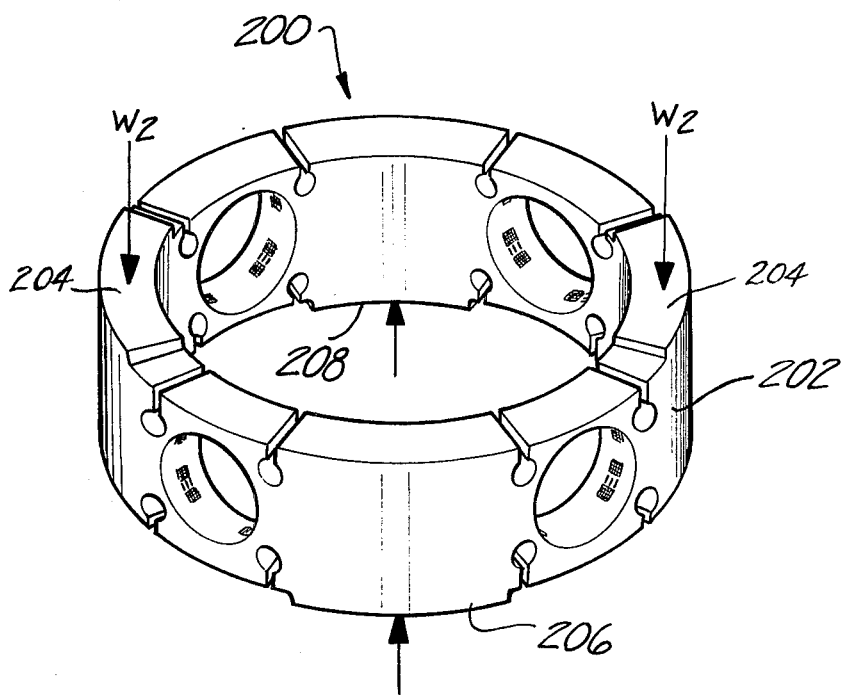
FIG. 8 is a perspective view of another weigh scale structure embodying the invention.

FIG. 8 discloses a second weigh scale structure 200 which embodies the invention and which is also adapted to provide an output signal responsive to the magnitude of a weight W imposed thereon. Structure 200 comprises a ring 202 of high modulus of elasticity material such as aluminum or steel and having four of the five-hole flexure designs machined therein at equal 90° intervals as shown. Each of the five-hole flexure designs is provided with strain gage resistors in the manner previously described, such resistors being interconnected into a parallel bridge arrangement to provide a single reading as will be apparent to those skilled in the art. The load is applied across the upper surfaces 204 of the ring 202 at diametrically spaced points. The load reaction or support force is applied across the bottom surface of the ring by means of support stand portions 206 and 208 at diametrically spaced points. The diametrically spaced points for the imposition of the load are on a diameter which is disposed at 90° to the diameter for the reaction force and all load areas are precisely mediate the five-hole flexure areas as shown. Accordingly, the load, which may be a weight on a pan or the like is applied directly to the ring causing elastic structural deformation therein. This deformation causes variation in the resistive values of the strain gages in the flexure areas thus producing a reading proportional to the weight W.

It can be seen that the structure 202 is easily machined and thus provides an extremely convenient and inexpensive structure for the precision weighing of various items. The invention may be implemented in still further forms and for still further uses and applications and accordingly the foregoing descriptions are not to be considered as exhaustive of the various possibilities.

It will be noted that in all cases the satellite apertures on each side of the longitudinal centerline of the five-hole flexure pattern are isolated from one another; e.g., aperture 22 is isolated from aperture 24 by the cuts extending to the nearest external surface. The same is true of apertures 134 in the beam 106. Where an exterior surface is not available because the pattern occurs in a large surface area not near a boundary, long slots may be formed so as to span the distance between (and slightly beyond) adjacent pairs of satellite apertures and the cuts may then be made from the apertures to the slots to provide the isolation.

It is to be understood that the invention herein is believed to lie in the basic five-hole flexure design which is illustratively embodied in the load cells 10 and 54 and is not limited to the specific geometric configuration of those cells, although such specific details may in themselves comprise invention. Accordingly, the basic design may be embodied in a great variety of cells of varying physical configuration and varying practical application.

What is claimed is:

1. A load cell comprising: a solid body of high modulus of elasticity material having end portions and laterally opposite exterior faces; means for securing said end portions to a load receiving and reference structure respectively to tend to laterally displace said end portions by said load; a first major aperture bored through the faces of the body to define a first interior cylindrical surface fully bounded by said body and mediate said end portions; a plurality of second minor apertures bored through the faces of the body including opposed pairs of apertures disposed on either side of the longitudinal axis of said body and about said major aperture to define second interior surfaces adjacent but spaced from the first aperture; means allowing bending of the portions of the body mediate said minor and major apertures by said lateral displacement of said end portions, said means including means relieving said second interior surfaces to an edge of the body; said portions of said body mediate said first aperture and each of said oppositely disposed minor apertures defining first and second paths transmitting an applied load through the body on opposite sides of the longitudinal axis, each path having therein first and second stress concentrating flexure areas comprised of said portions of said body mediate said major and minor apertures; strain sensitive gage means mounted on said first interior surface at each of said flexure areas for producing resistance changes in response to the bending strain in said load transmitting paths as the body is subjected to said load; bridge circuit means connecting each of said gages into a bridge circuit having two legs each to be connected across a source of potential, each leg being made up of the series combination of a gage in one load path and a gage in the other load path which is directly opposite on the body whereby axial loading strains and bending moment strains of said flexure areas are additive in effect, the bridge circuit means having output terminals in the legs and between the gages thereof from which an electrical signal may be derived as an indication of the loading of said body.

2. A load cell as defined in claim 1 wherein said means securing said end portions includes means for loading said body as a beam.

3. Apparatus as defined in claim 1 wherein said means securing said end portions includes means formed in the body for loading the body along the longitudinal axis.

4. Apparatus as defined in claim 1 wherein said means for securing said end portions to a load receiving and reference structure respectively includes a first rigid frame member connected to said load receiving structure and to one of said end portions, a second rigid frame member connected to said reference structure and to the other of said end portions, and spring hinge means connected to said first and second frame members and supporting said first and second frame members against relative torsional movement to provide resistance to torsional warping of said body while transmitting said load from said first frame member to the connected end portion when a load is applied thereto.

5. Apparatus as defined in claim 4 wherein the first frame member is integrally interconnected with the one end portion by means of a small cross-section flexure area and the second frame member is integrally connected with the other end portion.

6. Apparatus as defined in claim 5 including an input frame member and means for mechanically connecting the input frame member to the first frame member for applying load to the body.

7. Apparatus as defined in claim 1 wherein said relieving means comprises for each second aperture a cut through the body and exiting to the nearest exterior surface thereof.

8. Apparatus as defined in claim 7 wherein the body is ring-shaped.

9. Apparatus as defined in claim 8 wherein the ring-shape body comprises a plurality of uniformly spaced flexure patterns, each pattern comprising first and second apertures as aforesaid.

10. A bending beam force transducer comprising a relatively thin bar of high modulus of elasticity material, a first aperture formed in the bar with the axis of the aperture along the minimum dimension to define a first interior cylindrical surface fully bounded by the bar; pairs of second smaller apertures formed in the bar adjacent to but spaced from the first aperture and uniformly spaced on opposite sides of a plane of symmetry extending through the centerline of the bar and the first aperture, the second apertures defining second interior cylindrical surfaces which open to an edge of the bar, and the material of the bar directly mediate the first cylindrical surface and each of the second apertures comprising flexure areas where bending strain is concentrated; means applying a load whereby said bar is loaded for bending so as to laterally displace said pairs of second apertures relative each other; and strain sensitive gage means on the first interior surface directly over each of the flexure areas for producing electrical signals responsive to forces applied to the body; bridge circuit means connecting said gages in a bridge circuit with diagonally opposite gages associated with flexure areas on either side of said plane of symmetry being connected together in diagonally opposite locations in respective bridge circuit legs, such that bending strain of said flexure areas is additive to tensile strain thereof.

11. Apparatus as defined in claim 10 wherein the bar is ring-shaped.

12. An arrangement for measuring a load component, comprising: a rigid body, a major opening formed in said body; opposed pairs of relief openings each extending into proximity with said major opening, and having a surface relieved to the exterior of said body thereby providing corresponding pairs of flexure areas disposed between said relief openings and said major opening; means for applying said load component to said body along a direction tending to laterally displace said opposed pairs of flexure areas from each other, whereby said flexure areas in each pair are placed in bending by said load in an opposite sense; resistance gaging means connected to each flexure area, sensing the strain of one side of each flexure area and producing corresponding gaging signals; gaging circuit means summing each gaging signals associated with said flexure area in each of said opposing pairs placed in bending in a similar sense; and meter means displaying the difference between said sums, whereby the difference in said sums corresponds to said load component.

* * * * *